United States Patent [19]
Akagiri

[11] Patent Number: 5,502,789
[45] Date of Patent: Mar. 26, 1996

[54] APPARATUS FOR ENCODING DIGITAL DATA WITH REDUCTION OF PERCEPTIBLE NOISE

[75] Inventor: Kenzo Akagiri, Kanagawa, Japan

[73] Assignee: Sony Corporation, Tokyo, Japan

[21] Appl. No.: 29,988

[22] Filed: Mar. 12, 1993

Related U.S. Application Data

[63] Continuation of Ser. No. 664,300, Mar. 4, 1991, abandoned, and a continuation-in-part of Ser. No. 553,608, Jul. 18, 1990, Pat. No. 5,197,087.

[30] Foreign Application Priority Data

| Mar. 7, 1990 | [JP] | Japan | 2-53504 |
| Mar. 14, 1990 | [JP] | Japan | 2-61248 |
| Mar. 14, 1990 | [JP] | Japan | 2-61249 |

[51] Int. Cl.$^6$ .................................................. G10L 9/00
[52] U.S. Cl. ............................................ 395/2.13; 395/2.36
[58] Field of Search ................ 381/29–40; 395/2.1–2.39

[56] References Cited

U.S. PATENT DOCUMENTS

| 4,495,620 | 1/1985 | Steele et al. | 370/118 |
| 4,754,492 | 6/1988 | Malvar | 382/41 |
| 4,790,015 | 12/1988 | Callens et al. | 381/31 |
| 4,790,016 | 12/1988 | Mazor et al. | 381/36 |
| 4,791,654 | 12/1988 | DeMarca et al. | 375/122 |
| 4,878,230 | 10/1989 | Murakami et al. | 375/27 |
| 4,896,362 | 1/1990 | Veldhuis et al. | 381/37 |
| 4,914,701 | 4/1990 | Zibman | 381/36 |
| 4,941,152 | 7/1990 | Medan | 381/31 |
| 4,972,484 | 11/1990 | Theile et al. | 381/37 |
| 4,985,700 | 1/1991 | Mikami | 341/59 |
| 5,051,840 | 9/1991 | Watanabe et al. | 358/433 |
| 5,051,991 | 9/1991 | Szczutkowski | 381/33 |
| 5,109,417 | 4/1992 | Fiedler et al. | 381/36 |
| 5,115,240 | 5/1992 | Fujiwara et al. | 381/37 |
| 5,117,228 | 5/1992 | Fuchigami et al. | 381/46 |
| 5,142,656 | 8/1992 | Fiedler et al. | 381/37 |
| 5,166,686 | 11/1992 | Sugiyama | 341/155 |

FOREIGN PATENT DOCUMENTS

| WO88/04117 | 6/1988 | European Pat. Off. | |
| 0446037 | 9/1991 | European Pat. Off. | H04B 1/66 |
| 3132228 | 10/1989 | Japan | |
| WO91/16769 | 10/1991 | WIPO | H04B 1/66 |

OTHER PUBLICATIONS

Xu et al. "Time–Frequency Domain Adaptive Filters", ICASSP '89, pp. 1154–1157, Feb. 1989.
B. Edler: "Coding of audio signals with overlapping block transform and adaptive window function", Frequenz, vol. 43, No. 9, Sep. 1989, pp. 252–256.
Rundfunktechnische Mitteilungen, vol. 33, No. 4, Aug. 1989, Norderstedt De pp. 149–154; Vaupel: Transformation-scodierung fur qualitativ hochwertige Audiosignale mit Signalvorundnachverarbeitung im Zeitbereich p. 149, right column, line 4—p. 150, left column, line 5; figures 1, 2 p. 151, right column, line 3–line 27; figures 6,7.
Bell System Technical Journal vol. 56, No. 5, May 1977, New York US pp. 7474—769 Chrochiere: On the Design of Sub–band Coders for Low–Bit–Rate Speech Communication p. 749, line 6–line 20; figure 1.

*Primary Examiner*—Allen R. MacDonald
*Assistant Examiner*—Michelle Doerrler
*Attorney, Agent, or Firm*—William S. Frommer; Alvin Sinderbrand

[57] ABSTRACT

Apparatus for efficiently encoding a digital signal divides the digital signal into a number of signals within respective predetermined frequency bands which are segmented into blocks which, in turn, are orthogonally transformed so as to form coefficient data. The coefficient data is then quantized. A detection circuit detects whether at least the divided signal within the lowest frequency band contains a transient. If a transient is detected, a control circuit controls the encoding processing of a least the divided signal within the lowest frequency band by, for example, increasing the number of bits used for quantizing, reducing the block size, and/or reducing the signal level so as to reduce the perceptibility of noise in the processed signal.

45 Claims, 8 Drawing Sheets

BEFORE FFT

BEFORE FFT

AFTER IFFT

TEMPORAL MASKING

BURKE SPECTRUM

MASKING SPECTRUM

SYNTHESIZING

5,502,789

APPARATUS FOR ENCODING DIGITAL DATA WITH REDUCTION OF PERCEPTIBLE NOISE

This application is a continuation of application Ser. No. 07/664,300, filed Mar. 4, 1991 now abandoned.

Also, this application is a continuation-in-part of Ser. No. 553,603 now U.S. Pat. No. 5,197,087, filed Jul. 18, 1990.

BACKGROUND OF THE INVENTION

1. Field of the Invention

This invention relates to apparatus for encoding digital signals.

2. Description of the Prior Art

A known digital signal encoding apparatus employs a bit allocation encoding technique, according to which an input digital signal, such as a speech or other audio signal, is divided into a plurality of channels on a time or frequency axis and the number of bits for each of the channels is adaptively allocated so as to efficiently encode the input digital signal. The apparatus may, for example, employ: subsidiary (sub) band coding (SBC), in which the audio or other signal is divided on a time axis into a plurality of frequency bands for encoding the signal; so-called adaptive transformation coding (ATC), in which the signal is divided into a plurality of frequency bands by quadrature-transforming the signal on a time axis into a signal on a frequency axis for adaptively encoding the signal in each band; or so-called adaptive bit allocation coding (APC-AB), which is a combination of sub band coding (SBC) and so-called adaptive predictive coding (APC) which divides a signal on a time axis into a plurality of bands, transforms each band signal into base bands (low frequency bands), and thereafter performs a plurality of orders of linear predictive analysis for predictively encoding the signal.

A specific process used, for example, for band dividing in these various efficient encoding techniques may include the steps of dividing an input audio signal in a given unit time into blocks, transforming (quadrature or orthogonal transformation) a time axis into a frequency axis by performing a fast Fourier transform (FFT) for each block to obtain FFT coefficient data from each block, and dividing the coefficient data into a plurality of frequency bands. In this case, encoding is performed by quantizing (requantizing) the FFT coefficient data. Division of an audio signal into bands may be performed in such a manner as to take account of, for example, characteristics of the human sense of hearing. That is, an audio signal may be divided into a plurality of bands (for example, 25 bands) so that higher frequency bands, which are generally referred to as critical bands, have wider bandwidths.

The human sense of hearing includes various sound masking effect, including a so-called temporal masking effect and a so-called simultaneous masking effect. The simultaneous masking effects results in a sound (or noise) of relatively low level that is generated simultaneously with a sound of relatively high level being masked by the sound of relatively high level so that the sound of relatively low level cannot be heard. The temporal masking effect occurs both after and before a sound of high level so as to provide so-called forward masking and backward masking effects, respectively. The forward masking effect lasts for a relatively long period of time (for example, about 100 milliseconds) after a high level sound transient, while the backward masking effect lasts for a short period of time (for example, about 5 milliseconds). The levels (amounts) of the forward and backward masking effects are about 20 dB and 30 dB, respectively.

If an audio signal in a given unit time block is subjected to fast Fourier transformation when the signal is encoded, an inverse fast Fourier transformation (IFFT) is performed when the signal is decoded. Noise generated by the FFT and IFFT will generally appear over the entirety of the block in the signal obtained by the decoding and encoding. Accordingly, if a transient sound level change occurs in a block B which is subjected to an FFT or IFFT, or, for example, if a transient increase in a signal in the block B results from the arrival of a signal portion C having an abruptly increasing level, like a signal generated by a percussion instrument such as a castanet, into a "no sound" or "no signal" portion U of the block, as shown in FIG. 1, a noise component generated by the carrying out of the FFT or IFFT processing will occur in the no-signal portion U. That is, noise components resulting from the high level signal portion C will occur in the no-signal portion U, as shown in FIG. 2. Therefore, when the signal is reproduced, the noise produced in the inherently no-signal portion or area is readily perceptible. The noise generated after the high level signal portion C by FFT or IFFT processing of a block having such a transient change can be relatively less readily heard since it is masked by the relatively long duration forward masking FM, as shown in FIG. 3. The noise generated before the high level signal portion C is, however, more readily heard, since the backward masking BM effect lasts for a relatively short period of time. That is, the noise generated before the time when the backward masking becomes effective is more readily heard.

As an example of a countermeasure for the case in which suppression of noise by the above-mentioned backward masking BM cannot be expected, the length of the unit time block to which the fast Fourier transfer is applied could be shortened so as to be about equal to the period of time (for example, 5 milliseconds) over which the backward masking BM is effective. That is, the time resolution of the efficient encoding could be increased (shortening the block length) to a period of time over which the backward masking BM effect caused by the high level signal portion C is effective.

However, since shortening of the unit time block length which is Fourier transformed will decrease the number of samples in the block, the frequency resolution provided by the Fourier transform is conversely lowered.

In general, the frequency analysis capability of the human sense of hearing is relatively low and relatively high at higher and lower frequencies, respectively. Accordingly, in practice, the unit item block length cannot be greatly shortened in view of the necessity of ensuring the required frequency resolution in the lower frequency band or range. That is, it is preferable to have a higher time resolution in the lower frequency band or range.

In general, since the block is longer for a lower frequency band signal and is conversely shorter for a high frequency band signal, it is effective to increase the time resolution (to shorten the block length) at the higher frequency band.

OBJECTS AND SUMMARY OF THE INVENTION

Accordingly, it is an object of the present invention to provide an apparatus for encoding a digital signal which avoids the above-mentioned disadvantages of the prior art.

More specifically, it is an object of the present invention to provide a digital signal encoding apparatus which minimizes the perceptibility of noise generated by the transformation of a frequency band signal which has been divided from a digital signal and which contains a transient.

Another object of the present invention is to provide a digital signal encoding apparatus which minimizes the perceptibility of the noise generated by the above-described transformation by making use of the temporal masking effect.

A further object of the present invention is to provide an apparatus for efficiently encoding digital data in which a higher time resolution can be obtained in a higher frequency band and a higher frequency resolution can be obtained in a lower frequency band, and in which the perceptibility of noise generated due to a high level signal in a block in a lower frequency band can be reduced.

According to an aspect of the present invention, in apparatus for encoding a digital signal comprised of a plurality of samples, perceptible noise generated during the encoding is reduced by frequency dividing the digital signal comprised of the plurality of samples into a plurality of frequency divided signals within respective frequency bands; block segmenting each of the frequency divided signals within respective frequency bands into respective size blocks each having a respective number of the samples orthogonally transforming the blocks to form coefficient data; quantizing the coefficient data with a number of bits to form an encoded digital signal; detecting a transient in the frequency divided signal within the lowest frequency band and for generating an output signal indicating that the transient has been detected; and, in response to the output signal indicating the transient detection, controlling the encoding of at least the frequency divided signal within the lowest frequency band so as to reduce the perceptibility of noise in the encoded digital signal.

When the block is formed, the block length can be made longer (the time resolution made higher) in a higher frequency band and the number of samples in one block can be increased. The coefficient data of each band which is quantized can be coefficient data of each of the bands (for example, 25 bands) making up a so-called critical area or critical band area.

If there is a transient change in a block of data in at least the lowest frequency band, the influence of noise upon the data in the block can be reduced by increasing the number of quantization bits allocated for the block in the lowest frequency band.

A similar effect to that achieved by increasing the number of bits used for quantization of a block of the lowest frequency band signal in which a transient is detected can be achieved by reducing the block size and/or reducing the level of the lowest frequency band signal.

The above, and other objects, features and advantages of the present invention, will be apparent from the following detailed description of the preferred embodiments thereof, which is to read in conjunction with the accompanying drawings, in which corresponding parts are identified by the same reference numbers.

DESCRIPTION OF THE PREFERRED EMBODIMENTS

An apparatus for encoding a digital signal according to the embodiments of the present invention will now be described with reference to the drawings.

Figure 4:
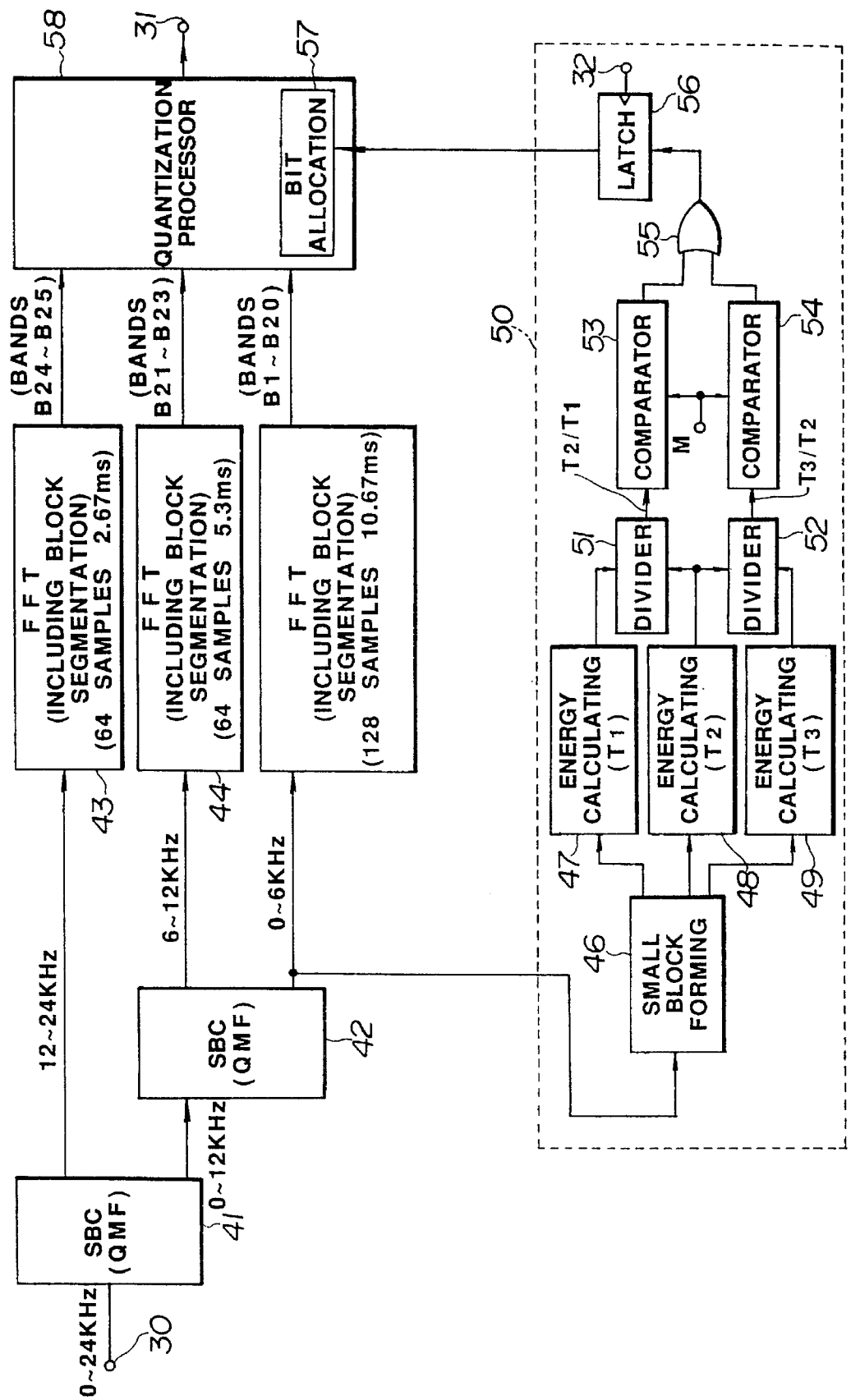
FIG. 4 is a schematic block diagram of an apparatus for efficiently encoding digital data according to an embodiment of the present invention.

FIG. 4 shows an apparatus which is operative to encode input digital data, such as a speech or other audio signal in the form of a series of digital samples, by using, for example, the above-mentioned sub band coding (SBC) technique. That is, in the apparatus shown in FIG. 4, input digital data supplied via an input terminal 30 is divided in a known manner into a plurality of frequency bands (frequency band signals) by so-called quadrature mirror filters (QMFs) 41 and 42. The division is carried out such that the bandwidth of the divided bands generally increases with frequency. Thus, in the present example, as explained in more detail below, the input signal is divided into three bands of which the highest frequency band has a bandwidth of 12 kHz and the other two have bandwidths of 6 kHz each.

A block having a plurality of samples is formed for each of the divided bands by a respective one of three fast Fourier transform (FFT) circuits 43, 44 and 45. A quadrature (orthogonal) transformation (in which a time axis is transformed into a frequency axis) is performed for each of the blocks in the respective one of the circuits 43, 44 and 45 by, for example, a fast Fourier transform, to obtain coefficient data (FFT coefficient data). That is, in a manner known in the art, each of the circuits 43, 44 and 45 acts both as block segmentation means for forming blocks of samples from the respective divided frequency band signal applied thereto, and as orthogonal transformation means for orthogonally transforming the blocks into coefficient data.

The FFT coefficient data from the circuits 43, 44 and 45 are then quantized with an adaptive allocation bit number (as described below) by a quantization processor 58, and the resultant quantized data are outputted at an output terminal 31.

When the blocks are formed in the circuits 43, 44 and 45, the time resolution is increased (by reducing the length of the block) in a higher frequency band, while the frequency resolution is increased (by increasing the number of samples in one block) in a lower frequency range. In the present embodiment, the coefficient data of each band which is quantized is from several bands (for example, 25 bands) constituting the so-called critical bands (see below) which make up a critical area of the spectrum of the human sense of hearing.

The apparatus of FIG. 4 includes a transient detection circuit 50, which detects a transient change of block data in at least the lowest divided frequency band before the quadrature transformation, which determines the number of bits to be allocated for the quantization carried out in the quantization processor 58. The bit allocation circuit 57 is controlled in accordance with an output produced by the detection circuit 50. Specifically, when a transient change is detected by the circuit 50, the number of allocated bits used for quantization of the FFT coefficient data in the lowest frequency band, namely that coefficient data produced by the FFT circuit 45, is increased. That is, the detection circuit 50 is operative to detect a block having a transient change, as described above with reference to FIG. 1, more particularly, a rising-up portion (leading edge) at which the level of the signal increases.

The apparatus of FIG. 4 reduces the perceptibility of the noise generated (as described above with reference to FIGS. 1 to 3) by the above-mentioned high level signal portions C by increasing the number of bits used in the quantization of blocks in the lowest frequency band found to contain such signal portions.

The apparatus of FIG. 4 will now be described in more detail. The audio digital data supplied to the input terminal 30 have, for example, a bandwidth of 24 kHz, and have been sampled at a sampling frequency fs of, for example, 48 kHz. The digital data are divided by the QMFs 41 and 42 into the three above-mentioned frequency bands, namely a relatively wide high frequency band (12 to 24 kHz), a relatively narrow intermediate frequency band (6 to 12 kHz) and a relatively narrow low frequency band (0 to 6 kHz). The QMF 41 divides the 0 to 24 kHz digital data so as to provide 12 kHz to 24 kHz and 0 to 12 kHz outputs which are supplied to the FFT circuit 43 and the QMF 42, respectively, in which the 12 kHz to 24 kHz output is the above-mentioned highest frequency band. The 0 to 12 kHz output fed to the QMF 42 is further divided by the QMF 42 into 6 kHz to 12 kHz and 0 to 6 kHz outputs, which are supplied to the FFT circuits 44 and 45, respectively. The 6 kHz to 12 kHz and 0 to 6 kHz outputs are the above-mentioned intermediate and lowest frequency bands, respectively.

Each of the FFT circuits 43, 44 and 45 forms successive blocks each having a plurality of samples of the data of the respective frequency band supplied thereto and applies a Fourier transform to each block to provide FFT coefficient data. The FFT circuit 43 forms blocks, each having 64 samples, and generates FFT coefficient data for each block. As a result, the time resolution in the relevant frequency band (12 to 24 kHz) is as high as about 2.67 milliseconds (ms). The FFT circuit 44 forms blocks each having 64 samples in providing the FFT coefficient data. As a result, the time resolution at the 6 to 12 kHz band is about 5.3 milliseconds (ms). The FFT circuit 45 produces the FFT coefficient data by forming blocks each having 128 samples, whereby the time resolution at the 0 to 6 kHz band is about 10.67 milliseconds (ms).

Quantization is performed in the quantization processor 58 using the number of adaptive allocated bits which takes account of masking based on characteristics of the human sense of hearing. Accordingly, the outputs of the FFT circuits 43, 44 and 45 are caused to correspond to respective parts or bands of the above-mentioned critical area of the human sense of hearing. That is, the output of the FFT circuit 43 corresponds to two bands, such as bands B24 and B25 of the 25 critical bands designated B1 to B25, respectively, in a higher frequency part or band of the critical area. The output of the FFT circuit 44 corresponds to three bands such as the bands B21 to B23. The output of the FFT circuit 45 corresponds to twenty bands such as the bands B1 to B20 making up the lower frequency part or band of the critical area.

Figure 5:
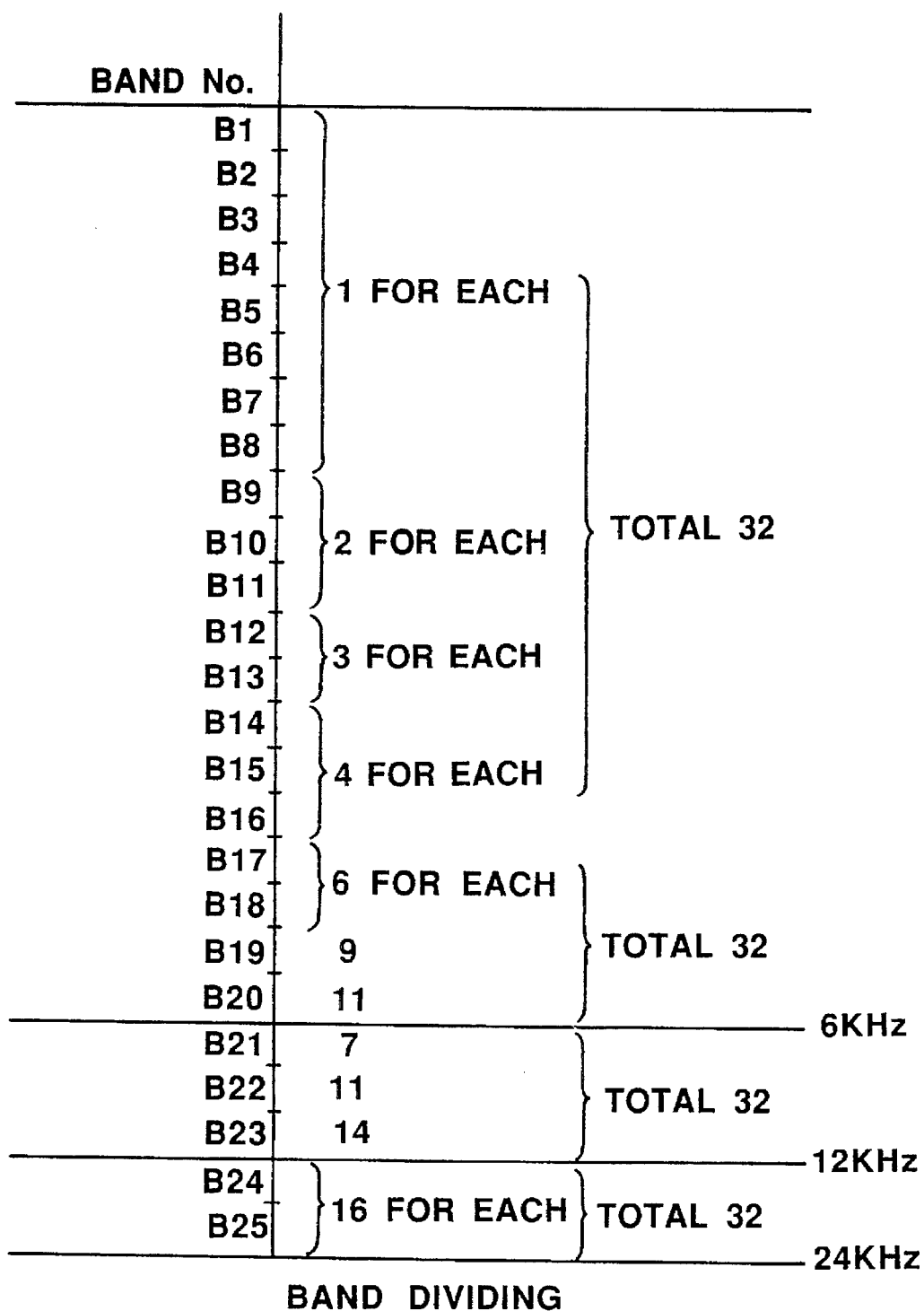
FIG. 5 is a chart to which reference will be made in describing a manner of effecting band division in the apparatus of FIG. 4.

The manner in which band division is effected on the frequency axis in the above embodiment is shown in FIG. 5. The resolutions in the frequency and time areas or domains are as shown in FIG. 6.

In FIG. 5, the number of coefficient data at the low frequency (0 to 6 kHz) bands B1 through B20 is selected to be one for each of the bands B1 to B8, two for each of the bands B9 to B11, three for each of the bands B12 and B13, four for each of the bands B14 to B16, six for each of the bands B17 and B18, nine for the band B19 and eleven for the band B20, making a total of 64, namely 32 for the bands B1 to B16 and 32 for the bands B17 to B20. The number of coefficient data in the intermediate frequency (6 to 12 kHz) bands B21 to B23 is selected to be seven for the band B21, eleven for the band B22, and fourteen for the band B23, making a total of 32. The number of coefficient data is sixteen in each of the high frequency (12 kHz to 24 kHz) bands B24 and B25, making a total of 32.

Figure 6:
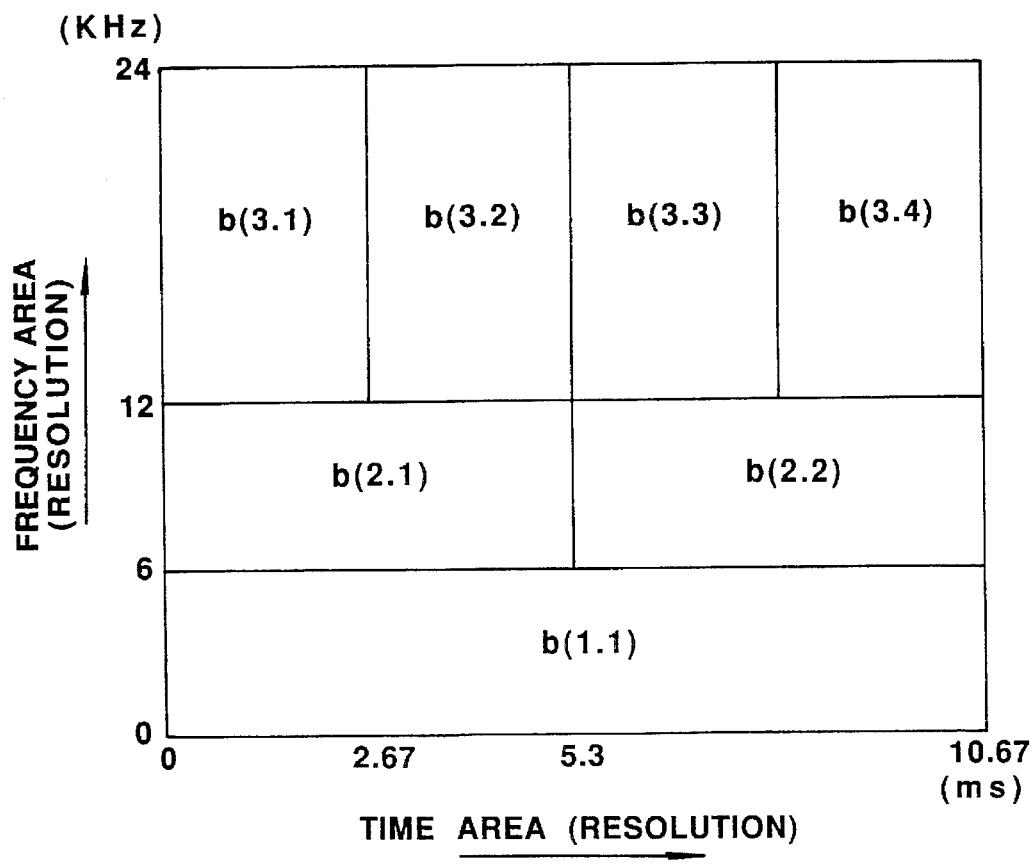
FIG. 6 is a diagram showing resolutions in frequency and time areas.

FIG. 6 shows one processing unit which may be used in the above-mentioned band dividing and fast Fourier transformation operations. The blocks are specified by two parameters m and n in a term b(m, n), where m denotes the band number and n denotes the time order. FIG. 6 shows that one block in each band of the 0 to 6 kHz lowest frequency band has a time length (duration) of 10.67 ms (time resolution), one block in the 6 to 12 kHz intermediate frequency band has a time length (duration) of 5.3 ms, and one block in the 12 to 24 kHz highest frequency band has a time length (duration) of 2.67 msec.

Figure 1:
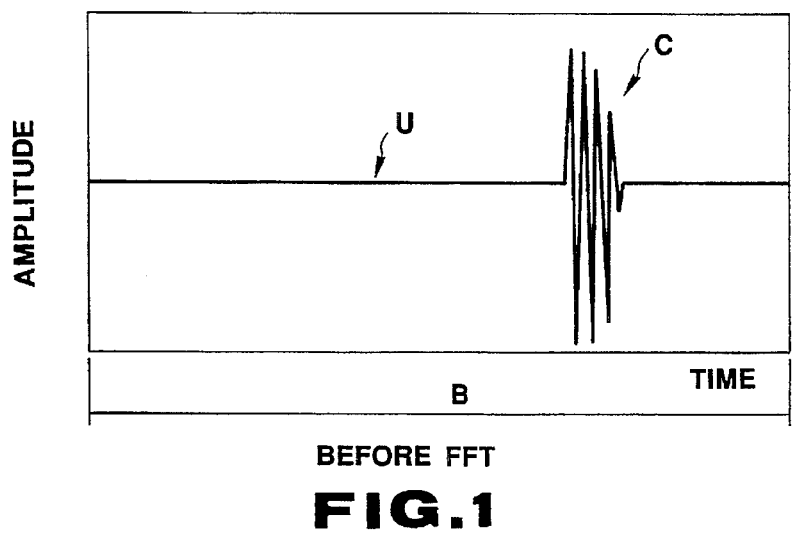
FIG. 1 is a graph showing data in which a transient change occurs prior to fast Fourier transformation.
Figure 2:
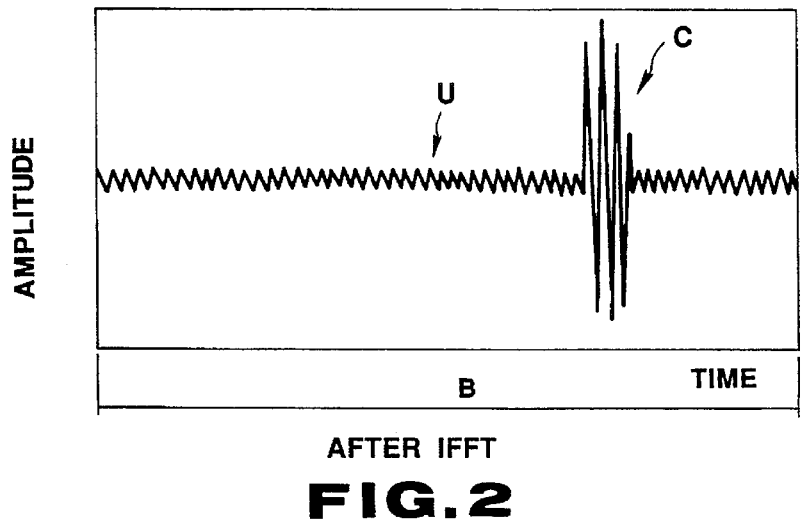
FIG. 2 is a graph showing noise generation that occurs after fast Fourier transforation or inverse fast Fourier transformation of the data shown in FIG. 1.
Figure 3:
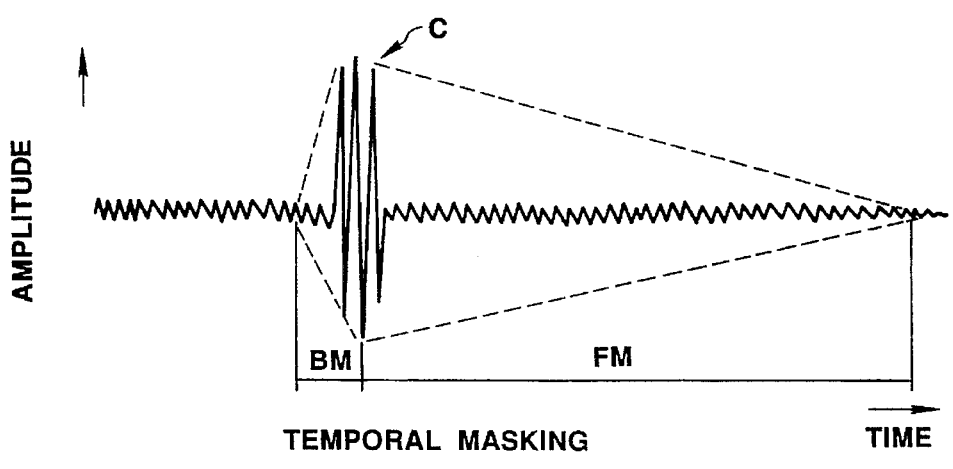
FIG. 3 is a graph used for explaining temporal masking.

As described above, both the resolutions on the frequency and time axes which are needed by the human sense of hearing are simultaneously satisfied in the present embodiment. Since the number of samples for processing is high at the lower frequencies (0 to 6 kHz), the frequency resolution thereat is relatively high. The bandwidth becomes greater and the time resolution becomes higher at the higher frequencies (12 to 24 kHz). The time resolution also becomes higher at the intermediate frequencies (6 to 12 kHz). If a transient change (a high signal level portion C) as shown in FIG. 1 is detected in the data of a block when fast Fourier transform processing of a block is performed by any of the FFT circuits 43, 44 and 45, the above-described noise shown in FIG. 2 is generated by the high level signal portion C in the portion U of the block having no signal. The backward masking effect caused by the high level signal portion C in the block lasts, as mentioned above, about 5 ms. Accordingly, it is necessary to reduce the block length, that is, the time resolution, to about 5 ms in order to effectively use the backward masking effect to mask the noise. Since the time resolutions at the high frequency (12 to 24 kHz) band and the intermediate frequency (6 to 12 kHz) band are (as mentioned above) 2.67 ms and 5.3 ms, respectively, in the encoding apparatus of the present embodiment, the time resolutions at the high and intermediate frequency bands are substantially satisfactory. Therefore, no remedial action is needed for these frequency bands.

However, in the apparatus of the present embodiment, the time resolution at the low frequency band (0 to 6 kHz) is 10.67 ms, as mentioned above, in order to ensure the necessary frequency resolution at the low frequency band. The apparatus is designed to cope with noise due to a high level signal portion C appearing in a block in the low frequency band, even though the time resolution is 10.67 ms. To accomplish this end, when a block having a transient change is detected by the circuit 50 before quadrature transformation in the low frequency band, the number of bits allocated for quantization in the quantization processor 58 of the FFT coefficient data of the block in the low frequency band is increased so that the perceptibility of the noise is reduced.

The construction of the detection circuit 50, and how it operates to detect transients in the low frequency band, will now be explained in more detail. Referring again to FIG. 4, the 0 to 6 kHz output (divided frequency band), that is, the low frequency output of the QMF 42, is also fed to a small block forming circuit 46 of the detecting circuit 50. The small block forming circuit 46 further divides one block (or, more precisely, those samples to be formed into a block) which comprises 128 samples in the case of the FFT circuit 45, into three (relatively) small blocks $T_1$, $T_2$ and $T_3$. The three small blocks are generated in the temporal order of $T_1$, $T_2$ and $T_3$. The small blocks $T_1$, $T_2$ and $T_3$ are fed to energy calculating circuits 47, 48 and 49, respectively, which determines the energy values of the respective small blocks. The energy values of the small blocks determined by the energy calculating circuits 47 and 48 are fed to a divider 51 and the energy values determined by the energy calculating circuits 48 and 49 are fed to a divider 52. The energy value of the small block $T_2$ is divided by the energy value of the small block $T_1$ in the divider 51 to provide an output ($T_2/T_1$). The energy value of the small block $T_3$ is divided by the energy value of the small block $T_2$ in the divider 52 to provide an output ($T_3/T_2$). The outputs ($T_2/T_1$) and ($T_3/T_2$) from the dividers 51 and 52, respectively, are fed to comparators (comparison circuits) 53 and 54, respectively. Each of the comparators 53 and 54 compares the output supplied thereto from that one of the dividers 51 and 52 connected thereto with a reference input supplied to both of the comparators 53 and 54 via a common terminal to determine whether or not the supplied output is M times the reference input. When a change in even one unit small block exceeds M times the reference input, a predetermined signal is outputted from the comparator 53 and/or the comparator 54. That is, a predetermined signal indicating that one of the blocks, each comprising 128 samples, has a transient change therein is outputted. The outputs of the comparators 53 and 54 are fed to a latch circuit 56 via an OR (logical addition) gate 55. The latch circuit 56 accepts the output of the OR gate 55 in synchronization with clock signals from a terminal 32, supplied at a rate of one per block of 128 samples, and supplies an output to the bit allocation circuit 57. Preferably, only a block having a transient change from which no backward masking effect can be expected is detected by performing the above dividing and comparing series of processing operations. For example, a block in which a backward masking effect due to the high level signal portion C is not complete (that is, when the period of time from the leading edge of the block to the leading edge of the signal is longer than 5 ms) is detected.

The bit allocation circuit 57 increases the number of quantization allocation bits of the block in the 0 to 6 kHz band in response to the predetermined signal accepted by the latch circuit 56 once per block of 128 samples. For example, the number of the allocation bits applied to the block of each band in the low frequency band can be made larger by one bit than that applied to the blocks in the other frequency bands. Alternatively, the number of allocation bits applied to the block having a transient change can be made double that applied to the other blocks.

Thus, in the present embodiment, if it is detected that a block in the low frequency band has a transient change, the perceptibility of the noise in that block is reduced by increasing the number of quantization bits applied to the block. Since detection of a block having a transient change is carried out in the low frequency band, malfunctioning is reduced as compared to a case in which detection is carried out, for example, in the full band. If the number of quantization allocation bits in the low frequency band is decreased, the number of allocation bits is decreased.

Figure 7:
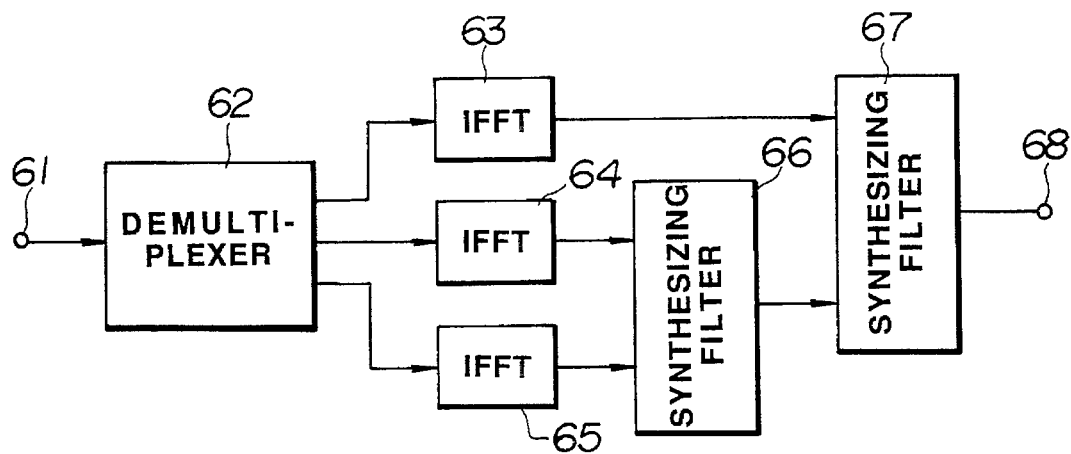
FIG. 7 is a block diagram of a decoder corresponding to the encoding apparatus of the present invention.

A decoder corresponding to the encoding apparatus described with reference to FIG. 4 is shown in FIG. 7. In FIG. 7, data from the output terminal 31 of FIG. 4 are transmitted to an input terminal 61. The transmitted data are divided by a demultiplexer 62 into data in a high frequency band (the bands B24 and B25 making up the range of 12 to 24 kHz), an intermediate frequency band (the bands B1 to B23 making up the range of 6 to 12 kHz) and a low frequency band (the bands B1 to B20 making up the range of 0 to 6 kHz). The data in the high, intermediate and low frequency bands are transmitted to inverse fast Fourier transform (IFFT) circuits 63, 64 and 65, respectively, which apply inverse fast Fourier transform processing to the inputted data. Outputs of the IFFT circuits 64 and 65 are fed to a synthesizing filter 66 having characteristics inverse to those of the QMF 42, whereby the inputted data are synthesized with each other. Outputs of the synthesizing filter 66 and the IFFT circuit 63 are fed to a synchronizing filter 67 having characteristics inverse to those of the QMF 41, whereby the inputted signals are synthesized. A decoded output signal from the synthesizing filter 67 is supplied to an output terminal 68.

Figure 8:
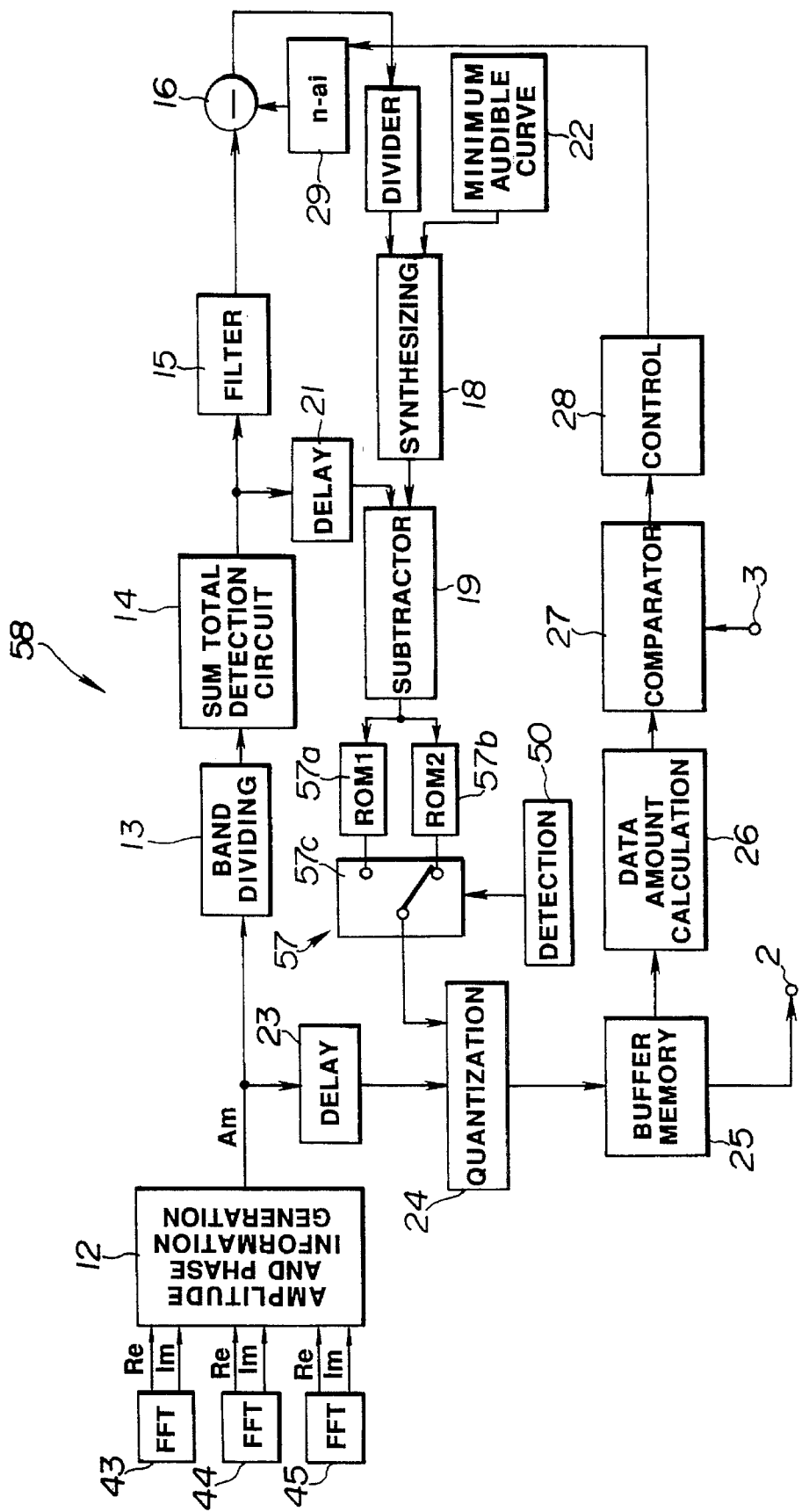
FIG. 8 is a block diagram of a quantization processor of the apparatus of FIG. 4.

A circuit of the quantization processor 58 of FIG. 4 is shown in FIG. 8. The circuit of FIG. 8 includes a sum total detection circuit 14 which receives FFT coefficient data from the FFT circuits 43, 44 and 45 of FIG. 4 after they have been processed by an amplitude and phase information generation circuit 12 and a band dividing circuit 13 (both described below). The sum total detection circuit 14 has noise level presetting means that presets an allowable noise level of each band unit based upon the energy (or peak value, or an average value) of each band as more fully described hereinafter. The sum total detection circuit 14 is coupled to a filter circuit 15. A quantization circuit 24 performs quantization processing of each band in accordance with the energy of each band (as detected by the sum total detection circuit 14) and the number of allocation bits depending upon the level difference of the noise level presetting means, and increases the number of the bits allocated for a block of the low frequency band in which a transient change is detected. The noise level presetting means presets a higher allowable noise level for a band having the same energy in which the frequency of the critical band is higher.

The circuit shown in FIG. 8 includes the detection circuit 50, described above with reference to FIG. 4, which detects a transient change in a block of data of at least a lowest frequency band before quadrature transformation, and the bit allocation circuit 57 (also described above with reference to FIG. 4) which determines the number of quantization allocation bits. The bit allocation circuit 57 is controlled in accordance with the output of the detection circuit 50 and, as described above, increases the number of quantization allocation bits for the low frequency band FFT coefficient data when a transient change is detected.

In the circuit of FIG. 8, an allowance function which presets an allowable noise level is generated by an allowance function generating circuit 29 which is controlled by an allowance function control circuit 28 for presetting the allowable noise level based on the allowance function, as will be described below.

Thereafter, a quantization output from the quantization circuit 24 is supplied by way of a buffer memory 25 to an output terminal 2.

The circuit of FIG. 8 also performs bit rate adjustment (so-called "bit packing") for making the bit rate per unit block (frame) constant.

Figure 9:
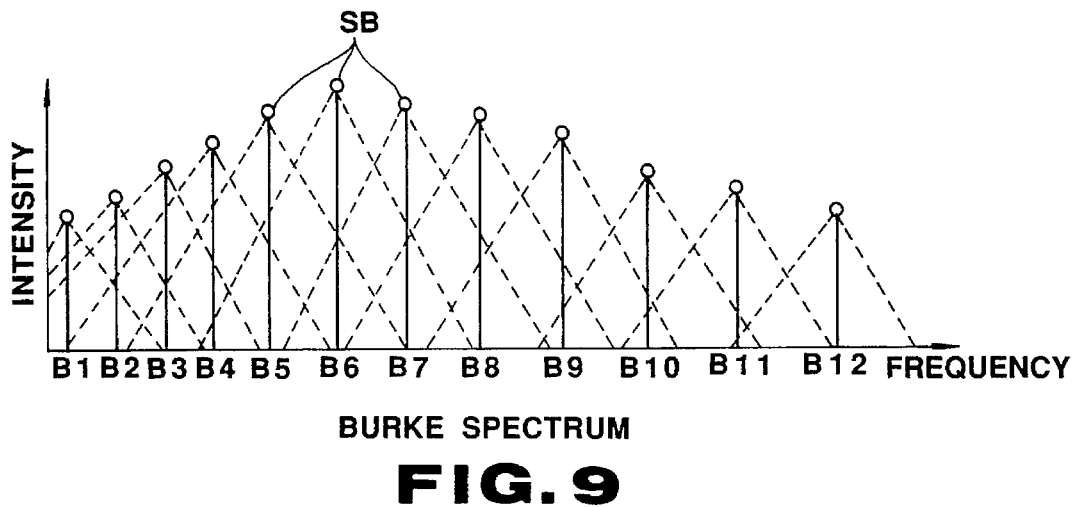
FIG. 9 is a graph showing a Burke spectrum.

That is, in FIG. 8, for example, FFT coefficient data comprising real Re and imaginary Im component values may be obtained from each of the FFT circuits 43, 44 and 45. The FFT coefficient data are transmitted to the amplitude and phase information generating circuit 12, in which an amplitude value Am and a phase value are obtained from the real component value Re and the imaginary component value Im, and from which the amplitude value Am is outputted. In this regard, since the human sense of hearing is generally sensitive to the amplitude (power) in different frequency areas, but is insensitive to the phase, the amplitude and phase information generating circuit 12 outputs only the amplitude value Am for subsequent processing and thus only the present amplitude value Am is transmitted to the band dividing circuit 13. The band dividing circuit 13 divides the received data representative of the amplitude value Am into the critical bandwidths. The amplitude value Am of each of the bands (for example, 25 bands) which have been divided into critical bands in the band dividing circuit 13 is transmitted to the sum total detection circuit 14, which determines (generates information representative of) the energy of each of the bands (spectrum level or intensity in each band) by calculating the sum total of the amplitude values Am (peak values or averaged values of the amplitude value Am) or the sum total of the energy. The output of the circuit 14, that is, the spectrum of the sum total of each band, is generally referred to in the art as the Burke spectrum. As an example, Burke spectrum SB of 12 of the bands of the critical area ($B_0$ to $B_{12}$) is shown in FIG. 9.

A weighting function is convoluted (convolved) into the Burke spectrum SB so as to account for the influence of the Burke spectrum SB on noise masking. (This masking is simultaneous masking, as opposed to the temporal masking discussed above.) The output of the sum total detecting circuit 14, that is, each spectral intensity value of the Burke spectrum, is fed to the filter circuit 15, at which each valve is multiplied by predetermined filter coefficient (a weighting function) so as to perform a convolution of the Burke spectrum. The sum total of the portions represented in FIG. 9 by dotted lines is computed by this convolution.

If a level alpha which corresponds to the allowable noise level (which will be described hereinafter) when the masking effect of the Burke spectrum SB is calculated is low, the masking spectrum (masking curve) will be lowered. As result the number of bits allocated for quantization by the quantization circuit 24 is increased. On the other hand, if the level alpha is high, the masking spectrum will be raised. As a result, the number of bits allocated for quantization may be decreased. The level alpha which corresponds to the allowable noise level is the allowable noise level of each band in the critical area which is obtained by inverse convolution (deconvoluting) processing. The spectral intensity or strength (energy) of audio data and the like at a higher frequency band is generally low. Accordingly, in the circuit of FIG. 8, the level alpha is raised in the high frequency band, in which the energy is low, so that the number of allocation bits in the higher frequency band portion is decreased. For this reason, the noise level presetting means presets a higher level alpha for the same energy as the frequency becomes higher.

That is, in the circuit of FIG. 8, the calculated level alpha corresponding to the allowable noise level increases for higher frequencies. The output of the filter circuit 15 and the allowance function (that is, a function representative of the masking level) from the generating circuit 29 are supplied to a subtractor 16 which is operative to determine the level alpha in the convoluted (convolved) area. The level alpha is controlled by increasing or decreasing the allowance function supplied from the allowance function generating circuit 29 which, in turn, is controlled by the function control circuit 28 (which will be described hereinafter).

The level alpha corresponding to the allowable noise level can be determined by equation 1 below:

$$\text{alpha} = S - (n - ai) \quad (1)$$

where n and a are constants and a>0, S is the intensity or strength of the Burke spectrum after convolution, (n−ai) is the allowance function, and i represents the number of the critical band starting from the lowest band.

As mentioned above, it is advantageous to reduce the number of bits beginning with a higher frequency band having a lower energy for reducing the number of whole bits. In a preferred embodiment of the present circuit, n=38 and a=1, which has been observed to produce substantially no deterioration of sound quality so that excellent encoding can be achieved.

Figure 10:
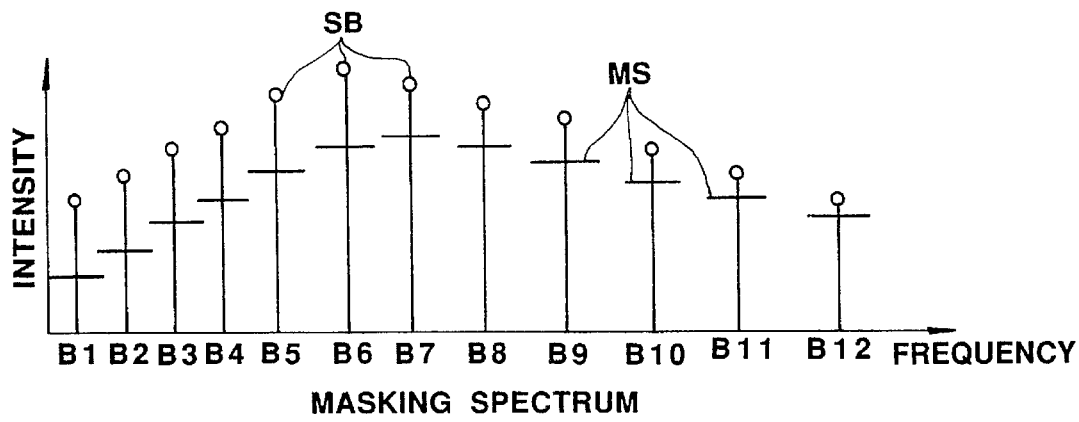
FIG. 10 is a graph showing a masking spectrum.

The level alpha, determined as described above, is supplied from the subtractor 16 to a divider 17, which inversely convolutes (deconvolutes) the level alpha at the convoluted (convolved) area. As a result, the masking spectrum, which represents an allowable noise spectrum and is represented at MS in FIG. 10, is obtained from the level alpha by performing the inverse convolution. Although complicated operations are typically required for performing inverse convolution, the inverse convolution is performed in the present embodiment by using a simplified divider 17.

The masking spectrum is then supplied to a subtractor 19 via a synthesizing circuit 18. The subtractor 19 is further supplied with the output of the sum total detection circuit 14, that is, the above-mentioned Burke spectrum SB, via a delay circuit 21. The subtractor 19 performs a subtracting operation between the masking spectrum MS and the Burke spectrum SB such that the Burke spectrum SB is masked lower than respective levels of the masking spectrum MS.

An output of the subtractor 19 is fed to the bit allocation circuit 57, which includes read only memories (ROMs) 57a and 57b in which data representing the number of allocation bits for quantization of each of the low, intermediate and high frequency bands are stored. Data representing the number of quantization allocation bits, depending upon the level difference between the energy level of each band of the critical area and the level preset by the noise level presetting means, are stored in the ROM 57b. Data representing the number of allocation bits in the lower frequency band exceeding that stored in the ROM 57b, and the number of allocation bits in the intermediate and higher frequency bands less than that stored in the ROM 57b, are stored in the ROM 57a. Outputs of the ROMs 57a and 57b are fed to a selection switch 57c of the bit allocation circuit 57, which is switched by the output of the latch 56 (FIG. 4) of the detection circuit 50. The switch 57c is switched so as to select the output of the ROM 57a when the output of the latch 56 indicates, for example, by a logic level "1" signal, detection of a block having a transient change. On the other hand, the switch 57c is switched to select the output of the ROM 57b when the output of the latch 56 indicates, for example, by a logic level "0" signal, that a block having a transient change has not been detected. The selected one of the ROMs 57a and 57b from the switch 57c is supplied to the quantization circuit 24. The circuit 24 performs quantization of the amplitude value Am supplied from the circuit 12 via a delay circuit 23 in dependence upon the output data of the selected one of the ROMs 57a and 57b. In other words, the quantization circuit 24 quantizes the component of each band of the critical area with the number of bits which are allocated in dependence upon the difference between the energy of that band of the critical area and the level of the noise level presetting means. More quantization bits are allocated to a block having a transient change for quantizing the component of each band. The delay circuit 21 is provided to delay the Burke spectrum SB from the sum total detection circuit 14 an amount corresponding to the delays caused by the processing of the circuits preceding the synthesizing circuit 18. Likewise, the delay circuit 23 is provided to delay the amplitude value Am an amount corresponding to the delays caused by the processing of the circuits preceding the bit allocation circuit 57.

Figure 11:
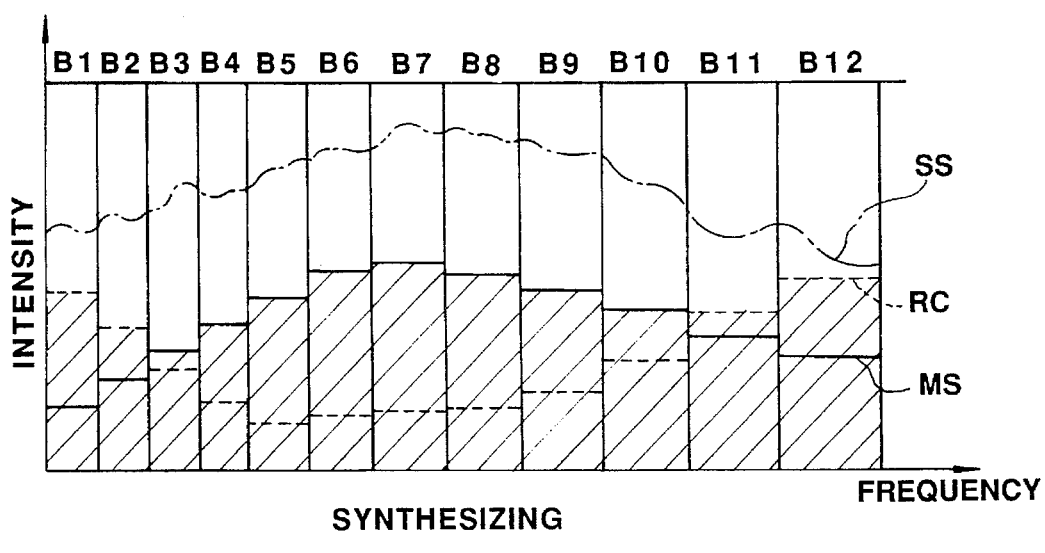
FIG. 11 is a graph showing a synthesized minimum audible curve and the masking spectrum.

The synthesizing circuit 18 synthesizes data supplied from a minimum audible curve generating circuit 22, representative of the so-called minimum audible curve (equiloudness curve) of the human sense of hearing (as, for example, shown as RC in FIG. 11), and the masking spectrum MS supplied from the divider 17. Accordingly, the allowable noise level can be suppressed to the levels represented by the hatched lines in FIG. 11 by synthesizing the minimum audible curve RC and the masking spectrum MS so that the number of bits allocated for quantization in the portions represented by the hatched lines can be reduced. FIG. 11 also shows a signal spectrum SS.

Data from the quantization circuit 24 is supplied to the buffer memory 25 and is supplied therefrom to a comparator (comparator circuit) 27 by way of a data amount calculation circuit 26 which is adapted to determine the amount of data supplied thereto. The comparator 27 compares the data amount from the circuit 26 with data supplied from a terminal 3, which represents a target value for the number of bits in one frame, for bit rate adjustment. The result of the comparison is supplied from the comparator 27 to the allowance function control circuit 28. The function control circuit 28 controls the allowance function generating circuit 29 so as to cause the circuit 29 to generate the allowance function for determining the level alpha and a function for bit rate adjustment.

The number of allocated bits in the higher frequency band is reduced for a block having no transient change. As a result, increasing the allowable noise level as the frequency shifts to a higher band in which the energy is lower, in the circuit of FIG. 8, reduces the number of bits allocated for quantization. Since the number of bits allocated in the lower frequency band is increased (whereas the number of bits allocated in the higher and intermediate frequency bands is decreased), the noise due to the high level signal portion C in the block can be reduced.

If so desired, the circuit described above can be modified so as not to perform the above-mentioned bit rate adjustment and/or the synthesis of the minimum audible curve. That is, in an arrangement in which no bit rate adjustment is performed, the data amount calculation circuit 26, the comparator 17 and the function control circuit 28 would be unnecessary and the allowance function from the function generating circuit 29 would be fixed, for example, at a value of (38-i). In an arrangement in which no minimum audible curve is synthesized, the minimum audible curve generating circuit 22 and the synthesizing circuit 18 would be unnecessary and the output from the subtractor 16 would be inversely convoluted (deconvoluted) by the divider 17 and then supplied to the subtractor 19.

Figure 12:
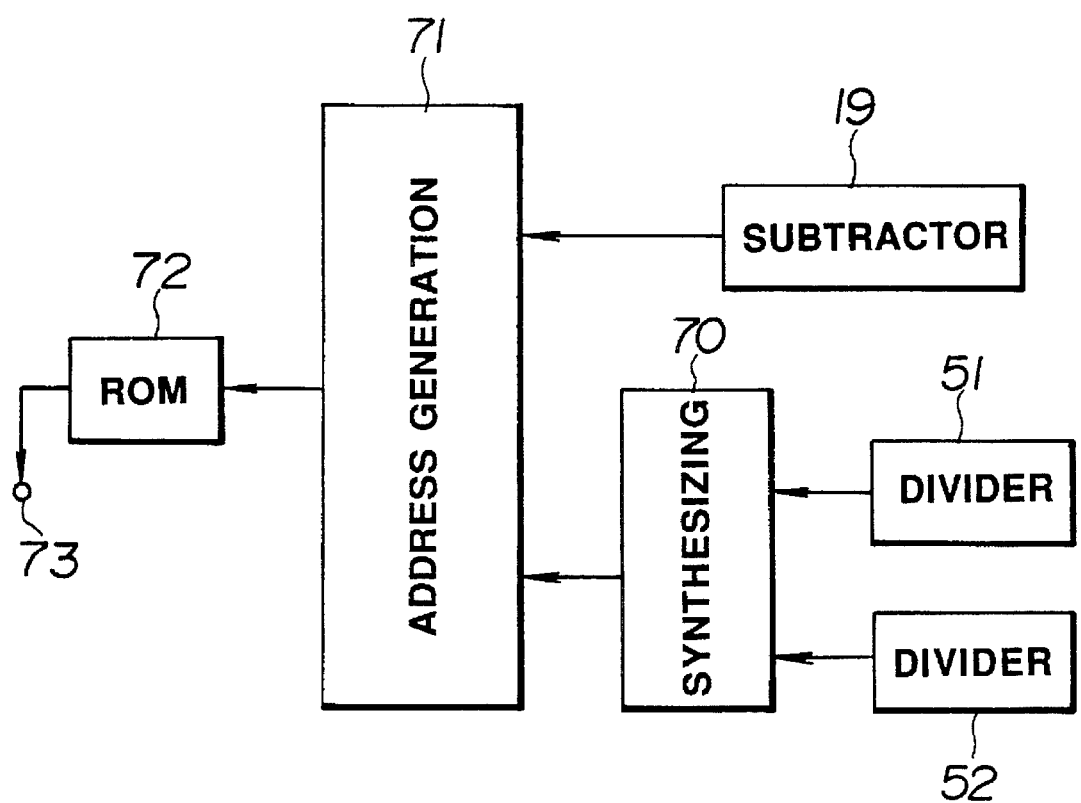
FIG. 12 is a block diagram to which reference will be made in describing an alternate manner of carrying out bit allocation.

Although the circuit of FIG. 8 can be supplied between two bit numbers for quantization by switching between the outputs of the two ROMs 57a and 57b as previously described, the number of allocated bits may instead be obtained by addressing only one ROM as, for example, shown in FIG. 12. FIG. 12 represents part of another example corresponding to the bit allocation circuit 57 of FIG. 8 and the detection circuit 50 of FIG. 4. Data representative of a plurality of numbers of bits for quantization are stored at respective addresses in a ROM 72. An output of a subtractor 19 (which corresponds to the subtractor 19 of FIG. 8) is supplied to an address generator 71 which generates address data for the ROM 72. The address generator 71 is also supplied with outputs of the dividers 51 and 52 of FIG. 4 via a synthesizing circuit 70. As a result, when a block having a transient change is detected, the address generator 71 generates and supplies to the ROM 72 address data indicting a memory area at which data are stored which represent a number of bits corresponding to the degree of the transient change. When a block does not have a transient change, the address data generated designates a memory area which stores data corresponding to that stored in the ROM 57b. Such address data is fed to the ROM 72 and, as a result, data representing the corresponding number of bits is outputted to a terminal 73 for use in the quantization processing. A more adaptive type of quantization processing, in which the number of bits allocated for quantization is made finer and more continuous, is obtained by using the arrangement of FIG. 12 or similar such arrangement.

In the embodiments described above, the number of bits allocated for quantization is controlled in accordance with the detection of a transient change before the quadrature transformation of a block of at least the lowest frequency band such that the number of allocated bits used in the lowest frequency band is increased when a transient change is detected. Therefore, a higher frequency resolution can be obtained in a lower frequency band in which the time resolution cannot be made higher. Further, a higher time resolution can be obtained in a higher frequency band. As a result, the perceptibility of noise due to a high level signal portion occurring in a block can be reduced by masking.

The desired effect of reducing noise perceptibility when a transient is detected in a block of the lowest frequency band signal (0 to 6 kHz) before orthogonal transformation of the signal (in the FFT circuit 45) can be alternatively obtained by techniques other than that described above. Such other techniques will now be described with reference to FIG. 13.

Figure 13:
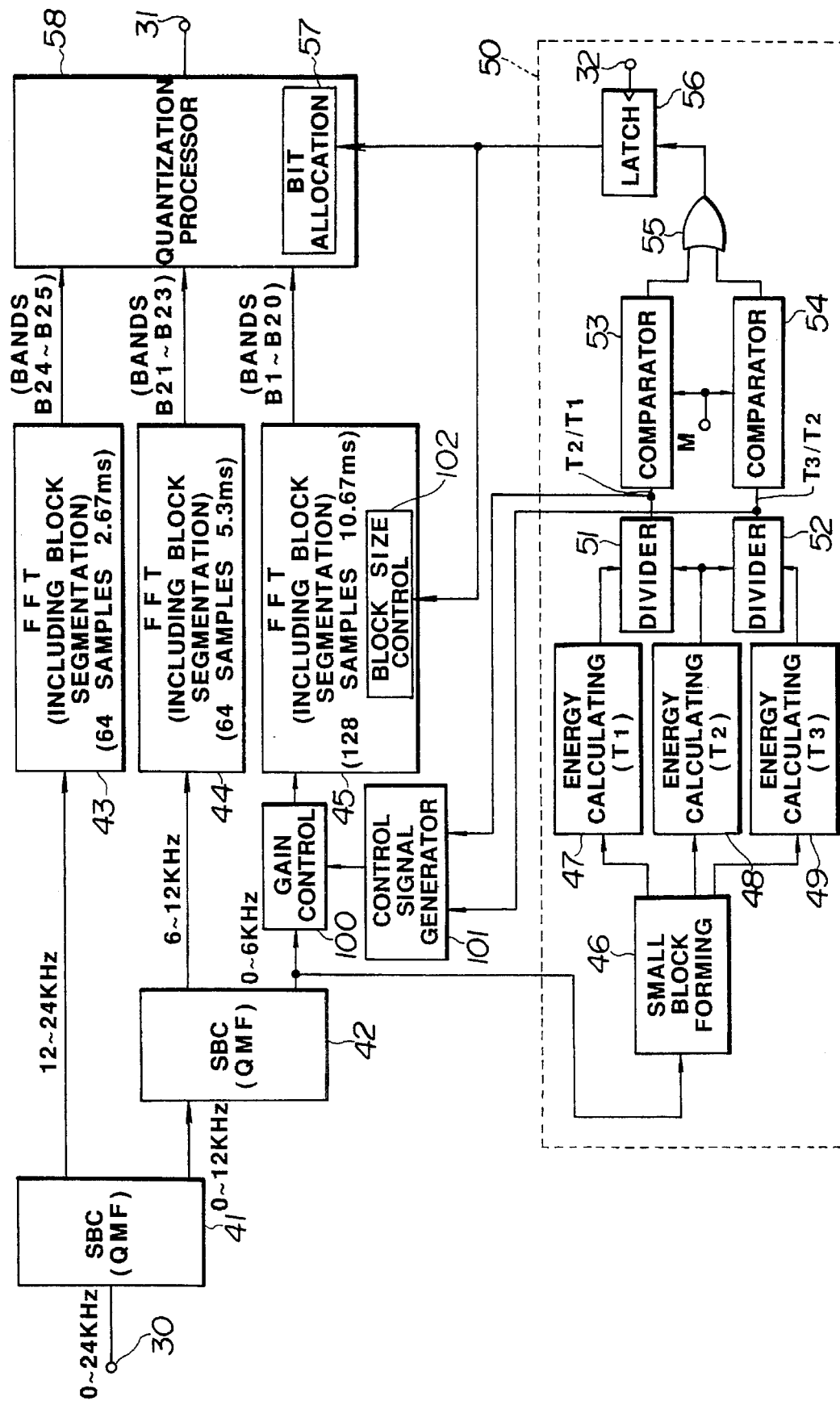
FIG. 13 is a schematic block diagram of an apparatus for efficiently encoding digital data according to another embodiment of the present invention, which utilizes techniques other than bit allocation number variation for reducing the perceptibility of noise when a transient is detected in a block of a low frequency band signal prior to orthogonal transformation.

FIG. 13 shows an encoding apparatus in accordance with an alternate embodiment of the present invention. The apparatus of FIG. 13 is substantially the same as that of FIG. 4, except for the addition of a gain control circuit 100, a control signal generator 101 and a block size control circuit 102. The gain control circuit 100 is connected in the bus supplying the lowest frequency band signal from the QMF circuit 42 to the FFT circuit 45 so as to be capable of controlling the level of the signal supplied to the FFT circuit 45. The operation of the gain control circuit 100 is controlled by the control signal generator 101, which has a pair of inputs respectively connected to the outputs ($T_2/T_1$) and ($T_3/T_2$) of the dividers 51 and 52 of the detection circuit 50. The control signal generator 101, like the synthesizing circuit 70 of FIG. 12, synthesizes the outputs of the dividers 51 and 52.

The block size control circuit 102 forms part of the block segmentation means of the FFT circuit 45 and is operative to control the size of the blocks into which the 0 to 6 kHz divided frequency band signal is segmented by the block segmentation means of the FFT circuit 45. The block size control circuit 102 is connected to the latch 56 of the detection circuit 50 so as to receive the output logic level signal therefrom.

In the event the detection circuit 50 detects a transient in a block of the 0 to 6 kHz divided frequency band signal outputted by the QMF 42, the encoding apparatus of FIG. 13 can reduce the noise perceptibility in any one or more of the following three ways:

(A) Bit number variation

In this case, the apparatus of FIG. 13 functions in substantially the same way as the apparatus of FIG. 4 which was described in detain above with reference to FIGS. 1 to 12.

(B) Block size reduction

In this case, when a transient is detected, the size (that is, the number of samples) of the block into which the 0 to 6 kHz signal is segmented by the FFT circuit 45 is reduced relative to the size adopted when no transient is detected.

(C) Level (gain) control

In this case, when a transient is detected, the level of the 0 to 6 kHz signal applied to the FFT circuit 45 is reduced (by controlling its gain) relative to the level adopted when no transient is detected.

Ways of implementing the techniques outlined at (B) and (C) above will now be described with reference to FIG. 13.

Consider first the case of technique (B), namely the block size reduction. FIG. 13 shows the block size control circuit 102 connected (for example) to the latch 56 of the detection circuit 50 so as to receive the binary level signal supplied therefrom. When no transient is detected, the latch 56 outputs (as explained above) a logic level "0". In response thereto, the block size control circuit 102 causes the FFT circuit 45 to segment the 0 to 6 kHz signal into its normal block size of 128 samples. However, when a transient is detected, the latch 56 outputs a logic level "1". In response thereto, the block size control circuit 102 causes the FFT circuit 45 to segment the 0 to 6 kHz signal into a block smaller size than that having 128 samples. Thus, in this example, the block size is switched in a binary manner between one of two different values in accordance with the value of the binary output of the latch 56. However, the block size may be controlled in a finer or more continuous manner by switching between more than two values in accordance with the detected degree of the transient change. This could be done, for example, by arranging for the block size control circuit 102 to receive, instead of the output of the latch 56, a control signal based upon the outputs of the dividers 51 and 52, in a similar manner to that described above with reference to FIG. 12 or in a similar manner to that described below in which the gain can be controlled by employing the control signal generator 101.

Consider now the case of technique (C), namely the level (gain) control. FIG. 13 shows the gain control circuit 100 connected (for example) to the control signal generator 101 so as to receive a control signal therefrom and the control signal generator receiving the outputs of the dividers 51 and 52. When the outputs of the dividers 51 and 52 indicate that no transient is present, the control signal generator 101 in response thereto supplies a control signal of a predetermined value to the gain control circuit 100. As a result, the circuit 100 will apply a predetermined gain to the 0 to 6 kHz signal such that its level is not influenced by the detection circuit 50. That is, in this situation, for example, the level of the 0 to 6 kHz signal applied to the FFT circuit 45 may be the same at that obtained in the apparatus of FIG. 4 (which does not incorporate the gain control circuit 100). However, when the outputs of the dividers 51 and 52 indicate that a transient is present, the control signal generator 101 in response thereto varies the control signal supplied to the gain control circuit 100 so as to reduce the gain of the circuit 100 whereby the level of the 0 to 6 kHz signal applied to the FFT circuit 45 is reduced as compared to the level when no transient is detected. The amount by which the gain of the gain control circuit 100 (and therefore the level of the 0 to 6 kHz signal applied to the FFT circuit 45) is reduced may, in this situation, vary continuously in accordance with the values of the outputs of the dividers 51 and 52, so as to achieve a relatively fine control of the gain as between multiple levels, depending upon the detected degree of transient change. (A technique similar to that described above with reference to FIG. 12 could be used.) If, however, binary control of the gain is acceptable, that is, if it is acceptable for the gain to be varied between a normal value (no transient detected) and only one reduced value (transient detected), the apparatus of FIG. 13 could be modified so as to control the gain control circuit 100 by the binary output of the latch 56 rather than by the output of the control signal generator 101 (which in that event would not be needed).

In summary, in the event of detection by the detection circuit 50 of a transient in a block of the 0 to 6 kHz divided frequency band outputted by the QMF 42, the noise perceptibility can be reduced by: (a) increasing the bit allocation number (in a binary or continuous manner); and/or (b) reducing the block size (in a binary or continuous manner); and/or (c) reducing the level of the signal (in a binary or continuous manner) before it is supplied to the FFT circuit 45. The apparatus described above with reference to FIGS. 1 to 12 utilizes only technique (a). On the other hand, the apparatus described above with reference to FIG. 13 permits the use of technique (a) and/or (b) and/or(c). As is to be appreciated, the circuitry shown in FIG. 13 may be simplified if it were desired to employ technique (b) only, technique (c) only, or techniques (b) and/or (c) only.

Although illustrative embodiments of the present invention have been described in detail herein with reference to the accompanying drawings, it is to be understood that the invention is not limited to those precise embodiments, and that various changes and modifications can be effected therein by one skilled in the art without departing from the scope or spirit of the invention as defined by the appended claims.

I claim:

1. Apparatus for encoding a digital signal comprised of a plurality of samples, said apparatus comprising:

frequency dividing means for dividing said digital signal comprised of said plurality of samples into a plurality of frequency divided signals within respective frequency bands;

encoding means for encoding said frequency divided signals including block segmentation means for segmenting each of said frequency divided signals into respective size blocks each having a respective number of said samples, orthogonal transformation means for orthogonally transforming said blocks to form coefficient data, and quantization means for quantizing said coefficient data with a number of bits to form an encoded digital signal;

transient detection means receiving at least the one of said plurality of frequency divided signals within the lowest of said frequency bands for detecting a transient in the received frequency divided signal within the lowest frequency band and for generating an output signal indicating that said transient has been detected; and control means responsive to said output signal from said transient detection means for controlling the encoding performed by said encoding means of at least said frequency divided signal within said lowest frequency band so as to reduce the perceptibility of noise in the encoded digital signal.

2. Apparatus according to claim 1, wherein said control means includes quantizing bit number control means for controlling the number of bits used by said quantization means for quantizing said coefficient data such that the number of bits used for quantizing at least said coefficient data formed from said frequency divided signal within the lowest frequency band is increased when said output signal from said transient detection means indicates that said transient has been detected.

3. Apparatus according to claim 2, wherein said control means further includes:

first memory means for storing data calculated by said quantization means in accordance with a spectral examination of said coefficient data which is representative of the number of bits to be used by said quantization means;

second memory means for storing data which differs from said data stored in said first memory means and which is representative of the number of bits to be used for quantizing at least said coefficient data formed from said frequency divided signal within said lowest frequency band when said output signal generated by said transient detection means indicates that said transient has been detected; and switch means for connecting said second memory means to said quantization means in response to said output signal generated by said transient detection means and in the absence of said output signal for connecting said first memory means to said quantization means.

4. Apparatus according to claim 2, wherein said control means further includes:

memory means for storing, at respective addresses therein, a plurality of different bit number data calculated by said quantization means in accordance with a spectral examination of said coefficient data which respectively correspond to different degrees of transient change; and address generator means receiving said output signal of said transient detection means and, in response thereto, generating address signals for supply to said memory means so as to cause said memory means to output the bit number data corresponding to the degree of transient change indicated by said output signal of said transient detection means for use by said quantization means.

5. Apparatus according to claim 1, wherein said control means includes block size control means for controlling the size of the blocks into which at least said frequency divided signal within the lowest frequency band is segmented such that the block size of at least said frequency divided signal within the lowest frequency band is decreased when said output signal from said transient detection means indicates that said transient has been detected.

6. Apparatus according to claim 1, in which each of said frequency divided signals within the respective frequency bands has a respective signal level and in which said control means includes signal level control means for controlling the level of at least said frequency divided signal within the lowest frequency band such that the level of at least said frequency divided signal within the lowest frequency band is decreased when said output signal from said transient detection means indicates that said transient has been detected.

7. Apparatus according to claim 1, wherein said transient detection means includes:

block forming means for segmenting the plurality of samples of said frequency divided signal within the lowest frequency band which are to be formed into one of said blocks of said signal within the lowest frequency band by said block segmentation means into a plurality of smaller size blocks;

energy calculating means for calculating respective energy values in said smaller size blocks and for generating output signals respectively corresponding to said energy values; and processing means for processing said output signals of said energy calculating means so as to form said output signal of said transient detection means.

8. Apparatus according to claim 7, wherein said processing means includes a plurality of divider means for dividing predetermined pairs of said output signals of said energy calculating means so as to produce respective divided output signals.

9. Apparatus according to claim 8, further comprising synthesizing means for combining said divided output signals from said divider means to form said output signal of said transient detection means.

10. Apparatus according to claim 8, wherein said processing means further includes:

a plurality of comparator means each receiving a respective one of said divided output signals and each operative to compare the received one of said divided output signals with a reference input signal and to generate a predetermined output signal if said received one of said divided output signals is substantially equal to a predetermined multiple of said reference input signal;

logical addition gate means receiving said predetermined output signal from each of said comparator means for generating a logical output signal therefrom; and latch means receiving said logical output signal of said logical addition gate means for producing said output signal of said transient detection means in binary form.

11. Apparatus according to claim 1, wherein said frequency dividing means divides said digital signal into said plurality of frequency divided signals within the respective frequency bands such that the one of said plurality of frequency divided signals within the highest frequency band has a bandwidth which is greater than the bandwidths of the other frequency divided signals.

12. Apparatus according to claim 11, in which said digital signal is an audio digital signal and in which said frequency dividing means divides said audio digital signal into signals within three frequency bands of substantially 0 to 6 kHz, 6 kHz to 12 kHz, and 12 kHz to 24 kHz bands, respectively.

13. Apparatus according to claim 1, wherein said frequency dividing means includes a plurality of quadrature mirror filters connected in cascade in which each of said quadrature mirror filters receives a respective input digital signal and divides said respective input digital signal into a pair of output digital signals each having a frequency range of half that of the respective input digital signal.

14. Apparatus according to claim 1, wherein said block segmentation means and said orthogonal transformation means include an orthogonal transformation circuit for each of said frequency bands.

15. Apparatus according to claim 1, wherein said orthogonal transformation means orthogonally transforms said blocks in accordance with fast Fourier transformations.

16. Apparatus for encoding a digital signal comprised of a plurality of samples, said apparatus comprising:

encoding means for encoding said digital signal including block segmentation means for segmenting said signal into blocks each having a respective number of said samples, transformation means for transforming said blocks from a time domain to a frequency domain so as to form coefficient data, and quantization means for quantizing said coefficient data with a number of bits to form an encoded signal;

transient detection means for detecting a transient in the received digital signal, including means receiving said blocks of samples for dividing said blocks into subblocks, means for determining a signal characteristic for each subblock, means for comparing the respective determined signal characteristics of the subblocks making up one of said blocks and means for generating an output signal indicating that said transient has been detected on the basis of a comparison of the respective determined signal characteristics; and control means responsive to said output signal from said transient detection means for controlling the encoding of said digital signal performed by said encoding means so as to reduce the perceptibility of noise in the encoded signal.

17. Apparatus according to claim 16, wherein said control means includes block size control means for controlling the size of the blocks into which said digital signal is segmented such that the number of said samples in the block is decreased when the output signal from said transient detection means indicates that said transient has been detected.

18. Apparatus for encoding a digital signal comprised of a plurality of samples, said apparatus comprising:

frequency dividing means for dividing said digital signal comprised of said plurality of samples into a plurality of frequency divided signals within respective frequency bands; and encoding means for encoding said frequency divided signals including block segmentation means for segmenting each of said frequency divided signals into respective size blocks each having a respective number of samples, transformation means for transforming said blocks from a time domain to a frequency domain so as to form coefficient data, and quantization means for quantizing said coefficient data with a number of bits to form an encoded digital signal.

19. Apparatus according to claim 18, wherein said block segmentation means segments the frequency divided signal within at least one of said frequency bands into blocks which each have a respective number of samples which is larger than a respective number of samples of the blocks into which said block segmentation means segments the frequency divided signals that are not within said at least one of said frequency bands.

20. Apparatus according to claim 19, wherein said block segmentation means segments the frequency divided signal within said at least one of said frequency bands into blocks which have twice as many samples as said blocks into which said block segmentation means segments the frequency divided signals that are not within said at least one of said frequency bands.

21. Apparatus according to claim 20, wherein said block segmentation means segments the frequency divided signal within said at least one of said frequency bands into blocks which consist of 128 samples and said block segmentation means segments the frequency divided signals that are not within said at least one of said frequency bands into blocks which consist of 64 samples.

22. Apparatus according to claim 18, wherein said block segmentation means segments the frequency divided signal within a at least one of said frequency bands into blocks which each have a respective time duration that is longer than respective time durations of the blocks into which said block segmentation means segments the frequency divided signals that are not within said at least one of said frequency bands.

23. Apparatus according to claim 22, wherein said block segmentation means segments the frequency divided signal within said at least one of said frequency bands into blocks which each have a respective time duration that is at least twice as long as respective time durations of the blocks into which said block segmentation means segments the frequency divided signals that are not within said at least one of said frequency bands.

24. Apparatus according to claim 18, wherein said frequency dividing means divides said digital signal into said plurality of frequency divided signals within the respective frequency bands such that the one of said plurality of frequency divided signals within the highest frequency band has a bandwidth which is greater than the bandwidths of the other frequency divided signals.

25. Apparatus according to claim 18, wherein said digital signal is an audio digital signal and said frequency dividing means divides said audio digital signal into signals within three frequency bands consisting of a low band, a middle band and a high band.

26. Apparatus according to claim 25, wherein said low band is substantially 0 to 6 kHz, said middle band is substantially 6 kHz to 12 kHz, and said high band is substantially 12 kHz to 24 kHz.

27. Apparatus according to claim 25, wherein said block segmentation means segments said signal within said low band into blocks which each consist of 128 samples and said block segmentation means segments said signals within said middle and high bands, respectively, into blocks which each consist of 64 samples.

28. Apparatus according to claim 25, wherein said block segmentation means segments said signal within at least one of said bands into blocks which each have a duration of approximately 10.67 ms, and said block segmentation means segments said signal within another of said bands into blocks which each have a duration of approximately 2.67 ms.

29. Apparatus according to claim 25, wherein said block segmentation means segments said signal within one of said bands into blocks which each have a duration which is twice as long as a duration of the blocks into which said block segmentation means segments said signal within the other bands.

30. Apparatus according to claim 18, wherein said frequency dividing means includes a plurality of quadrature mirror filters connected in cascade in which each of said quadrature mirror filters receives a respective input digital signal and divides said respective input digital signal into a pair of output digital signals each having a frequency range of half that of the respective input digital signal.

31. Apparatus according to claim 30, wherein said plurality of quadrature mirror filters consists of a first quadrature mirror filter and a second quadrature mirror filter, said first quadrature mirror filter receiving said digital signal and dividing said digital signal into a high band signal and a base band signal, and said second quadrature mirror filter receiving said base band signal and dividing said base band signal into an intermediate band signal and a low band signal.

32. Apparatus according to claim 31, wherein said high band signal has a bandwidth of approximately 12 kHz, and said intermediate and low band signals each have a bandwidth of approximately 6 kHz.

33. Apparatus according to claim 31, wherein said high band has a bandwidth which is twice as wide as a bandwidth of said low band.

34. A method of encoding a digital signal comprised of a plurality of samples, comprising the steps of:

dividing said digital signal comprised of said plurality of samples into a plurality of frequency divided signals within respective frequency bands;

segmenting each of said frequency divided signals into respective size blocks each having a respective number of samples, transforming said blocks from a time domain to a frequency domain so as to form coefficient data, and quantizing said coefficient data with a number of bits to form an encoded signal.

35. A method according to claim 34, wherein the frequency divided signal within at least one of said frequency bands is segmented into blocks which each have a respective number of samples which is larger than a respective number of samples of the blocks resulting from segmentation of the frequency divided signals that are not within said at least one of said frequency bands.

36. A method according to claim 35, wherein the frequency divided signal within said at least one of said frequency bands is segmented into blocks which have twice as many samples as the blocks resulting from segmentation of the frequency divided signals that are not within said at least one of said frequency bands.

37. A method according to claim 36, wherein the frequency divided signal within said at least one of said frequency bands is segmented into blocks which consist of 128 samples and the blocks resulting from segmentation of the frequency divided signals that are not within said at least one of said frequency bands consist of 64 samples.

38. A method according to claim 34, wherein the frequency divided signal within at least one of said frequency bands is segmented into blocks which each have a respective time duration that is longer than respective time durations of the blocks resulting from segmentation of the frequency divided signals that are not within said at least one of said frequency bands.

39. A method according to claim 38, wherein the frequency divided signal within said at least one of said frequency bands is segmented into blocks which each have a respective time duration that is at least twice as long as respective time durations of the blocks resulting from segmentation of the frequency divided signals that are not within said at least one of said frequency bands.

40. A method according to claim 34, wherein said digital signal is divided into said plurality of frequency divided signals within the respective frequency bands such that the one of said plurality of frequency divided signals within the highest frequency band has a bandwidth which is greater than the bandwidths of the other frequency divided signals.

41. A method according to claim 34, wherein said digital signal is an audio digital signal and is divided during said dividing step into signals within three frequency bands consisting of a low band, a middle band and a high band.

42. A method according to claim 41, wherein said low band is substantially 0 to 6 kHz, said middle band is substantially 6 kHz to 12 kHz, and said high band is substantially 12 kHz to 24 kHz.

43. A method according to claim 41, wherein said segmenting step includes segmenting said signal within said low band into blocks which each consist of 128 samples and segmenting said signals within said middle and high bands, respectively, into blocks which each consist of 64 samples.

44. A method of according to claim 41, wherein said segmenting step includes segmenting said signal within at least one of said bands into blocks which each have a duration of approximately 10.67 ms, and segmenting said signal within another of said bands into blocks which each have a duration of approximately 2.67 ms.

45. A method according to claim 41, wherein said segmenting step includes segmenting said signal within one of said bands into blocks which each have a duration which is twice as long as a duration of the blocks resulting from segmentation of said signal within said other bands.

* * * * *